US008291000B2

(12) United States Patent
Grossfeld et al.

(10) Patent No.: US 8,291,000 B2
(45) Date of Patent: Oct. 16, 2012

(54) METHOD AND SYSTEM FOR MANAGING DATA TRANSACTION REQUESTS

(75) Inventors: Elena Grossfeld, Sunnyvale, CA (US); Surjatini Widjojo, Los Gatos, CA (US); Thorsten Lockert, San Jose, CA (US); Greg Seitz, Lake Oswego, OR (US); Kenneth Randall Wigginton, San Jose, CA (US); Christopher J. Kasten, Rancho Cordova, CA (US)

(73) Assignee: eBay Inc., San Jose, CA (US)

( * ) Notice: Subject to any disclaimer, the term of this patent is extended or adjusted under 35 U.S.C. 154(b) by 0 days.

(21) Appl. No.: 13/103,789

(22) Filed: May 9, 2011

(65) Prior Publication Data
US 2011/0208793 A1   Aug. 25, 2011

Related U.S. Application Data

(63) Continuation of application No. 12/637,662, filed on Dec. 14, 2009, now Pat. No. 7,941,469, which is a continuation of application No. 10/562,459, filed as application No. PCT/US2004/014997 on May 12, 2004, now Pat. No. 7,650,338.

(60) Provisional application No. 60/484,827, filed on Jul. 3, 2003.

(51) Int. Cl.
 *G06F 17/30* (2006.01)
(52) U.S. Cl. ......... 707/968; 707/964; 707/966; 707/969
(58) Field of Classification Search .................. 707/966, 707/612, 826, 960, 964, 968, 969, 972, 973, 707/974
See application file for complete search history.

(56) References Cited

U.S. PATENT DOCUMENTS

| 5,920,870 | A  | * | 7/1999  | Briscoe et al. ......................... 1/1 |
| 5,978,577 | A  | * | 11/1999 | Rierden et al. ......................... 1/1 |
| 6,065,002 | A  |   | 5/2000  | Knotts et al. |
| 6,442,748 | B1 |   | 8/2002  | Bowman-Amuah et al. |
| 6,487,542 | B2 |   | 11/2002 | Ebata et al. |
| 6,496,850 | B1 |   | 12/2002 | Bowman-Amuah |
| 6,529,909 | B1 |   | 3/2003  | Bowman-Amuah |

(Continued)

FOREIGN PATENT DOCUMENTS

WO    WO-2005010650 A2    2/2005

(Continued)

OTHER PUBLICATIONS

"U.S. Appl. No. 10/562,459 Response filed Mar. 12, 2009 to Non-Final Office Action mailed Dec. 12, 2008", 12 pgs.

(Continued)

*Primary Examiner* — Jean M Corrielus
(74) *Attorney, Agent, or Firm* — Schwegman Lundberg & Woessner, P.A.

(57) ABSTRACT

In various embodiments, a system, method, and related computer-related medium to process data transactions are provided. In one example, a system is arranged to process data transactions in a data store including a plurality of databases. The system includes a computer interface module to receive a data transaction request from at least one requesting computer and a data access layer having one or more processors to identify at least one database in the plurality of databases. The data access layer is to define an abstraction layer between a computer interface module and the plurality of databases.

24 Claims, 10 Drawing Sheets

U.S. PATENT DOCUMENTS

| | | | |
|---|---|---|---|
| 6,539,396 | B1 | 3/2003 | Bowman-Amuah |
| 6,550,057 | B1 | 4/2003 | Bowman-Amuah |
| 6,609,123 | B1 | 8/2003 | Cazemier et al. |
| 6,611,838 | B1 | 8/2003 | Ignat |
| 6,615,253 | B1 | 9/2003 | Bowman-Amuah |
| 6,640,244 | B1 | 10/2003 | Bowman-Amuah |
| 6,662,188 | B1 | 12/2003 | Rasmussen et al. |
| 6,775,680 | B2 | 8/2004 | Ehrman et al. |
| 6,912,719 | B2 | 6/2005 | Elderon et al. |
| 7,185,016 | B1 | 2/2007 | Rasmussen |
| 7,350,192 | B2 | 3/2008 | Seitz et al. |
| 7,350,195 | B2 | 3/2008 | Herbeck et al. |
| 7,403,946 | B1 * | 7/2008 | Taylor .................. 707/612 |
| 7,406,464 | B2 | 7/2008 | Kasten et al. |
| 7,650,338 | B2 * | 1/2010 | Grossfeld et al. ........ 707/999.01 |
| 7,725,460 | B2 | 5/2010 | Seitz et al. |
| 7,941,469 | B2 * | 5/2011 | Grossfeld et al. ............ 707/826 |
| 2005/0154722 | A1 | 7/2005 | Seitz et al. |
| 2005/0154765 | A1 | 7/2005 | Seitz et al. |
| 2005/0182758 | A1 | 8/2005 | Seitz et al. |
| 2006/0294038 | A1 * | 12/2006 | Grossfeld et al. .................. 707/1 |
| 2010/0094919 | A1 * | 4/2010 | Grossfeld et al. ............ 707/826 |
| 2011/0208793 | A1 * | 8/2011 | Grossfeld et al. ............ 707/826 |

FOREIGN PATENT DOCUMENTS

WO    WO-2005010650 A3    2/2005

OTHER PUBLICATIONS

"U.S. Appl. No. 10/562,459, Non-Final Office Action mailed Dec. 12, 2008", 10 pgs.

"U.S. Appl. No. 10/562,459, Notice of Allowance mailed SEp. 4, 2009", 19 pgs.

"U.S. Appl. No. 12/637,662 Non-Final Office Action mailed Aug. 19, 2010", 9 pgs.

"U.S. Appl. No. 12/637,662, Notice of Allowance mailed Jan. 7, 2011", 8 pgs.

"U.S. Appl. No. 12/637,662, Response filed Nov. 15, 2010 to Non Final Office Action mailed Aug. 19, 2010", 11 pgs.

"PCT International Search Report and Written Opinion", From Internation Application No. PCT/US2004/014997, (Jan. 16, 2005), pp. 1-10.

"International Application Serial No. PCT/US2004/014997, Intl. Preliminary Report on Patentability mailed Jun. 1, 2005", 3 pgs.

"International Application Serial No. PCT/US2004/014997, Written Opinion mailed Jan. 14, 2005", 3 pgs.

"International Application Serial No. PCT/US2004/014997, Written Opinion mailed Jan. 14, 2005", 2 pgs.

* cited by examiner

USER_TABLE — 42

MARKETPLACE number(38)
ID number(38)
USERID varchar2(64) (unique)
USER_STATE number(38)
PASSWORD varchar2(64) (encrypted)
SALT varchar2(64) (encrypt key for passwd)
LAST_MODIFIED date
USERID_LAST_CHANGE date
FLAGS number(38)
EMAIL varchar2(64) (unique)
COUNTRY_ID number(10)
UVDETAIL number(16)
UVRATING number(5)
SCORE number(38)
SITE_ID number(4)
CO_PARTNERID number(4)
BILLING_CURRENCY_ID number(3)

FIG. 3B

LISTINGS TABLE — 44

ID
DESCRIPTION
CATEGORY ID
PRICE
CLOSE_DATE
RESERVE_PRICE
SELLER_ID
BIDDER_ID (0->N)
LIST_DATE
REMINDER_SENT

FIG. 3A

METHOD AND SYSTEM FOR MANAGING DATA TRANSACTION REQUESTS

CROSS-REFERENCE TO RELATED APPLICATIONS

This present application is a continuation of U.S. patent application Ser. No. 12/637,662, filed Dec. 14, 2009 and issued as U.S. Pat. No. 7,941,469, which is a continuation of U.S. patent application Ser. No. 10/562,459, filed Dec. 29, 2005 and issued as. U.S. Pat. No. 7,650,338, which was a U.S. National Stage Filing under 35 U.S.C. 371 of International Application No. PCT/US2004/014997, filed May 12, 2004, which claims the benefit of U.S. Provisional Application No. 60/484,827, filed Jul. 3, 2003, which applications and publications are incorporated herein by reference.

FIELD OF THE INVENTION

The present invention relates generally to the field of electronic data management. More specifically, the invention relates to a method and system for managing data transaction requests in a data processing system.

BACKGROUND

Technological advancements have led to more sophisticated and powerful data management systems. Data processing in such systems require efficient handling a large number of data transactions (e.g. data reads and writes).

The advent of the Internet and the World Wide Web combined with the development of network-based commerce system applications has enabled companies to transact business globally in real time. Such network-based commerce systems may processes large amounts of data transactions from geographically separated users. The users may enter transactional requests over communications lines that directly address a master information source. In several cases, back-end systems (e.g., database servers) support the master information source and these back-end systems may need to be partitioned or copied for load balancing and/or fault tolerance.

SUMMARY OF THE INVENTION

Systems and methods are provided for managing requests to process data in a network-based data processing system, for example, a network-based commerce system. In one embodiment, a method is provided for processing data transactions in a data store that includes databases. In this method, a data transaction request is received from a requesting computer. Different databases are then identified from the databases using a data access layer that defines an abstraction layer. The data transmission request is then split into multiple data transaction requests, and a part of these requests is then communicated to at least one of the identified databases.

BRIEF DESCRIPTION OF THE DRAWINGS

The invention is now described, by way of example, with reference to the accompanying diagrammatic drawings in which like reference numerals are used to indicate the same or similar features, unless otherwise indicated.

FIGS. 3A and 3B are an exemplary listings and user tables of the database.

DETAILED DESCRIPTION

A method and system to process data transaction requests is described. In the following description, for purposes of explanation, numerous specific details are set forth in order to provide a thorough understanding of the present invention. It will be evident, however, to one skilled in the art that the present invention may be practiced without these specific details.

Although the invention is described with reference to a network-based commerce system, it is to be appreciated that it may apply in any data processing network that processes a plurality of data transactions (e.g., data read, data write, data delete, or the like transactions). In one exemplary embodiment, the invention may be used to facilitate load balancing and/or fail-over in a data processing system, facilitate scalability, and so on. When the invention is applied in a network-based commerce system or facility, it may host a plurality of listings or items. The term "listing" or "item" may refer to any description, identifier, representation or information pertaining to a listing, service, offering or request that is stored within a network-based commerce system. As such, a listing may be an auction or fixed-price offering (e.g., products such as goods and/or services), an advertisement, or a request for a listing or service.

Exemplary Transaction Facility

Figure 1:
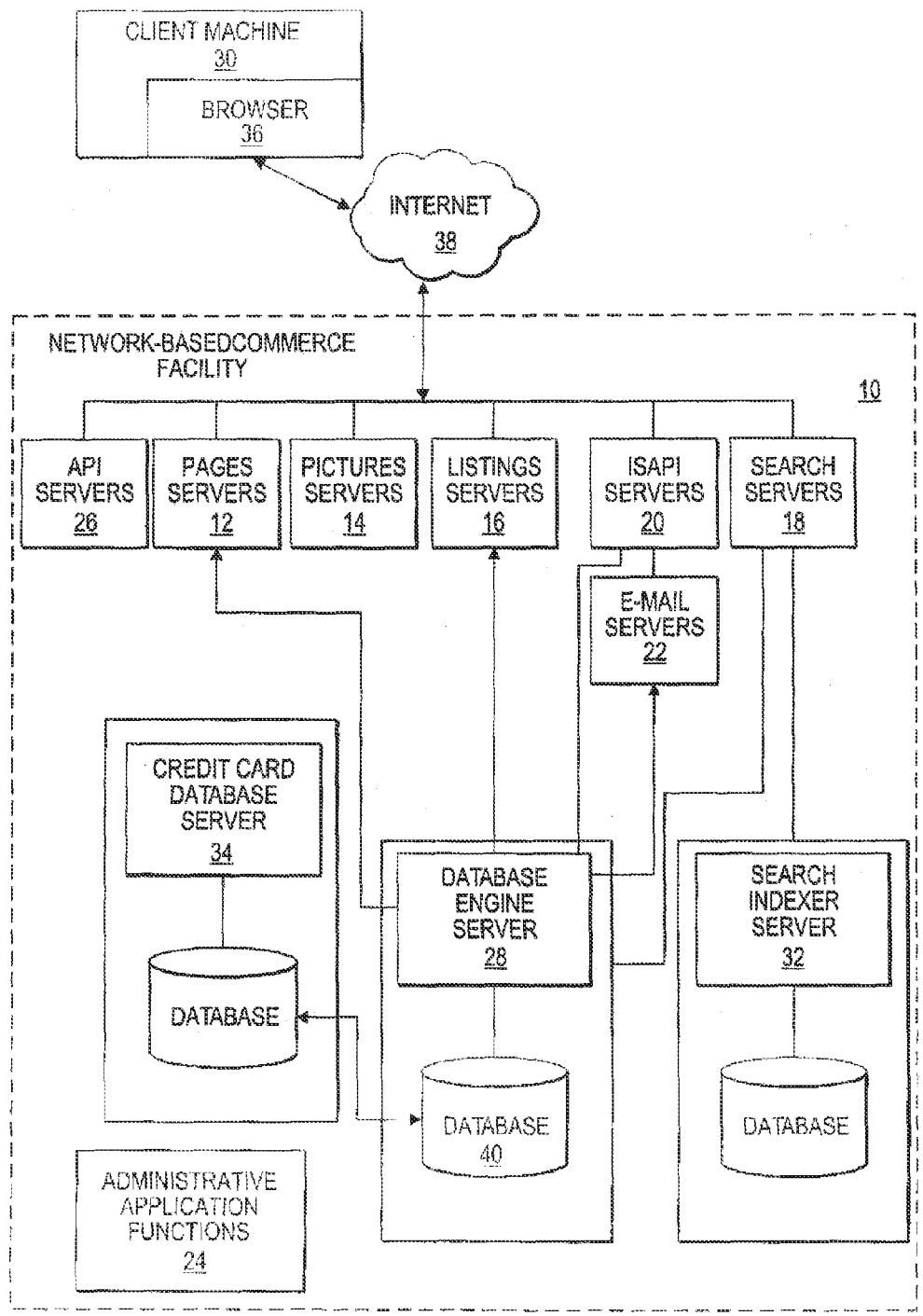
FIG. 1 is block diagram illustrating an exemplary network-based commerce system or facility, in accordance with an embodiment of the invention.

FIG. 1 is block diagram illustrating an exemplary network-based commerce system or facility 10, in accordance with the invention. While an exemplary embodiment of the present invention is described within the context of the network-based commerce system 10, the invention will find application in many different types of computer-based, and network-based, facilities (commerce, transaction or otherwise).

The network-based commerce system 10 includes one or more of a number of types of front-end servers that may each include at least one Dynamic Link Library (DLL) to provide selected functionality. The system 10 may include page servers 12 that deliver web pages (e.g., mark-up language documents), picture servers 14 that dynamically deliver images to be displayed within Web pages, listing servers 16 that facilitate category-based browsing of listings, search servers 18 that handle search requests to the system 10 and facilitate keyword-based browsing of listings, and ISAPI servers 20 that provide an intelligent interface to a back-end of the system 10. The system 10 may also include e-mail servers 22 that provide, inter alia, automated e-mail communications to users of the network-based commerce system 10. In one embodiment, one or more administrative application functions 24 facilitate monitoring, maintaining, and managing the system 10. One or more API servers 26 may provide a set of API functions for querying and writing to the network-based commerce system 10. APIs may be called through the HTTP transport protocol. In one embodiment, information is sent and received using a standard XML data format. Applications utilized to interact (e.g., upload transaction listings, review transaction listings, manage transaction listings, etc.) with the network-based commerce system 10 may be designed to use the APIs. Such applications may be in an HTML form or be a CGI program written in C++, Perl, Pascal, or any other programming language.

The API servers 26, page servers 12, picture servers 14, ISAPI servers 20, search servers 18, e-mail servers 22 and a database engine server 28 may individually, or in combination, act as a communication engine to facilitate communications between, for example, a client machine 30 and the network-based commerce system 10; act as a transaction engine to facilitate transactions between, for example, the client machine 30 and the network-based commerce system 10; and act as a display engine to facilitate the display of listings on, for example, the client machine 30.

The back-end servers may include the database engine server 28, a search index server 32 and a credit card database server 34, each of which maintains and facilitates access to a respective database.

In one embodiment, the network-based commerce system 10 is accessed by a client program, such as for example a browser 36 (e.g., the Internet Explorer distributed by Microsoft Corp. of Redmond, Wash.) that executes on the client machine 30 and accesses the network-based commerce system 10 via a network such as, for example, the Internet 38. Other examples of networks that a client may utilize to access the network-based commerce system 10 include a wide area network (WAN), a local area network (LAN), a wireless network (e.g., a cellular network), the Public Switched Telephone Network (PSTN) network, or the like. The client program that executes on the client machine 30 may also communicate with the network-based commerce system 10 via the API servers 26.

Exemplary Database Structure

Figure 2:
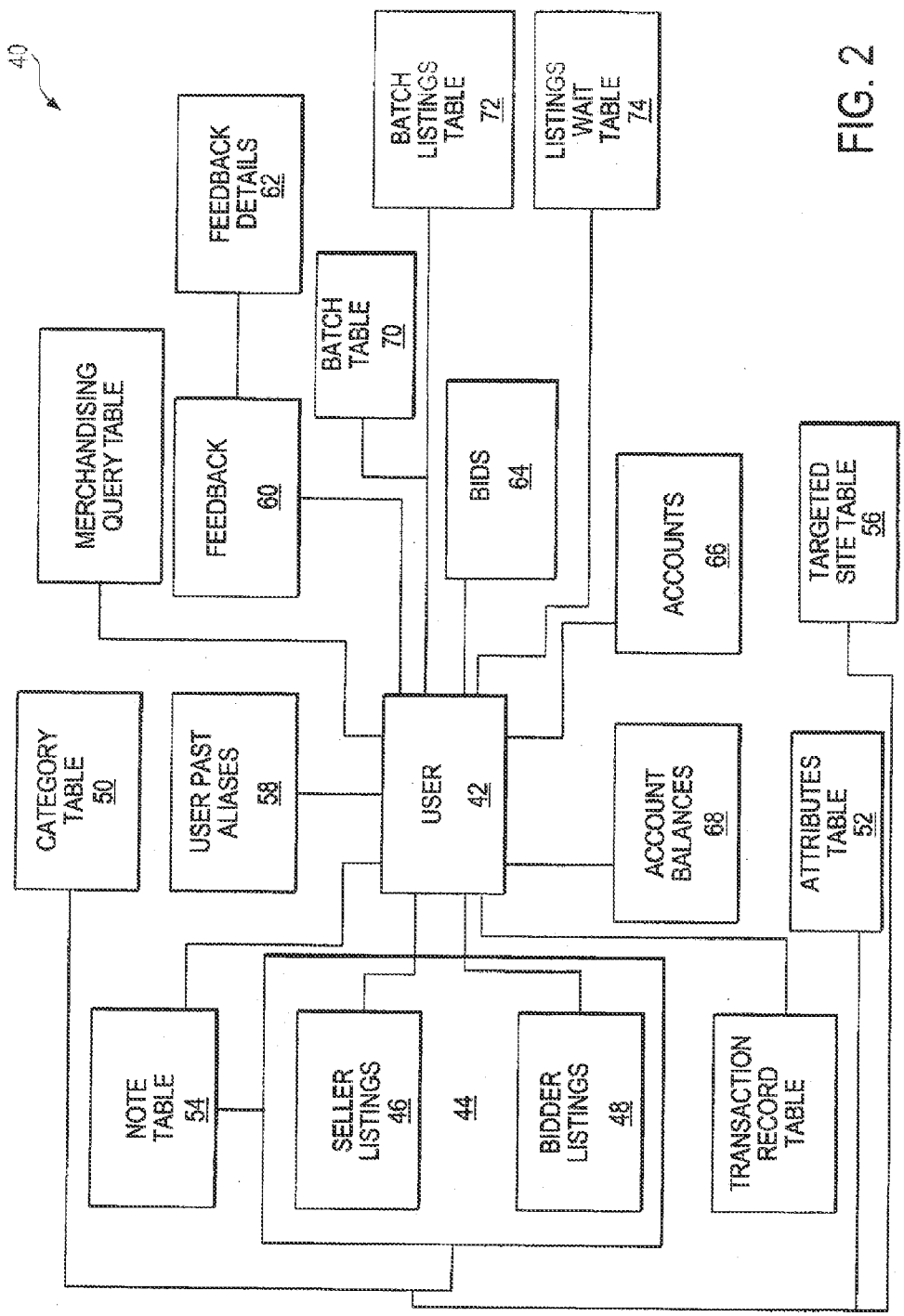
FIG. 2 is a database diagram illustrating an exemplary database, maintained by and accessed via a database engine server, which at least partially implements and supports the network-based commerce system in accordance with an embodiment of the invention.
Figure 9:
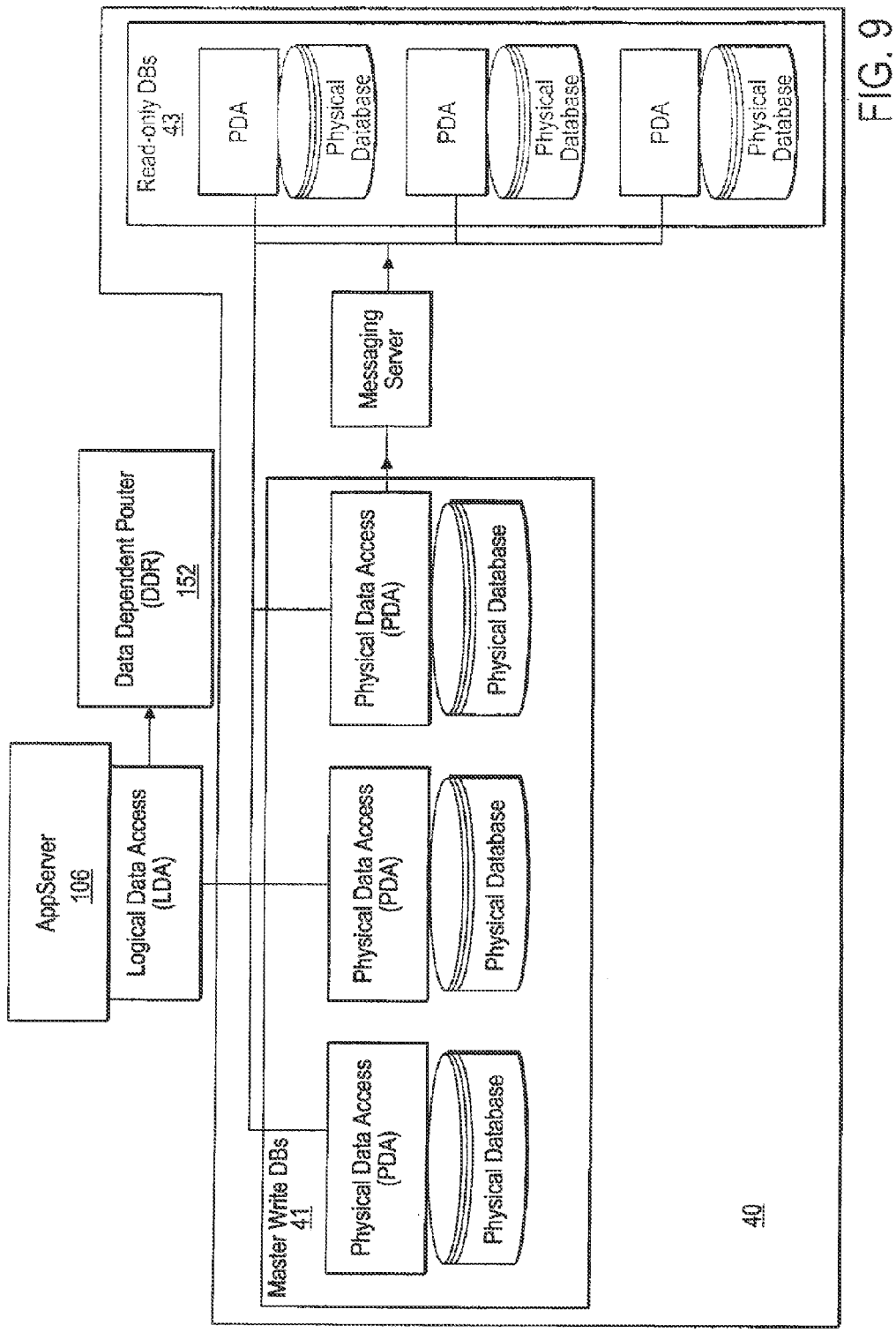
FIG. 9 shows exemplary system architecture with an exemplary split database arrangement accessed using the DDR module of FIG. 7.

FIG. 2 is a database diagram illustrating an exemplary database 40, maintained by and accessed via the database engine server 28, which at least partially implements and supports the network-based commerce system 10. As described in more detail below, in one embodiment the database engine server 28 may maintain a plurality of databases. For example, may maintain a master write database 41 (e.g., including a plurality of horizontally distributed databases—see FIG. 9), and a read-only database 43 that may, for example, allow loads to be balanced appropriately.

The database 40 may, in one embodiment, be implemented as a relational database, and includes a number of tables having entries, or records, that are linked by indices and keys. In an alternative embodiment, the database 40 may be implemented as collection of objects in an object-oriented database, as discussed by way of example in more detail below.

The database 40 (see FIG. 2) includes a user table 42 that contains a record for each user of the network-based commerce system 10. An exemplary record for each user is shown in FIG. 3B. A user may operate as a seller, a buyer, or both, when utilizing the network-based commerce system 10. The database 40 also includes listings tables 44 that may be linked to the user table 42. The listings tables 44 may include a seller listings table 46 and a bidder listings table 48. A user record in the user table 42 may be linked to multiple listings that are being, or have been, listed or offered for sale via the network-based commerce system 10. In one embodiment, a link indicates whether the user is a seller or a bidder (or buyer) with respect to listings for which records exist within the listings tables 44.

The database 40 also includes one or more divisions in the form of categories provided in category tables 50. Each record within the category table 50 may describe a respective category. In one embodiment, listings provided by the system 10 are arranged in the categories. These categories may be navigable by a user of the network-based commerce system 10 to locate listings in specific categories. Thus, categories provide a mechanism to locate listings that may be browsed. In addition or instead, an alphanumeric search mechanism may be provided by the search servers 18 to allow a user to search for specific listings using search terms or phrases. In one embodiment, the category table 50 describes multiple, hierarchical category data structures, and includes multiple category records, each of which describes the context of a particular category within the multiple hierarchical category structures. For example, the category table 50 may describe a number of real, or actual, categories to which listing records, within the listings tables 44, may be linked.

The database 40 is also shown to include one or more attributes tables 52. Each record within the attributes table 52 describes a respective attribute associated with a listing. In one embodiment, the attributes table 52 describes multiple, hierarchical attribute data structures, and includes multiple attribute records, each of which describes the context of a particular attribute within the multiple hierarchical attribute structures. For example, the attributes table 52 may describe a number of real, or actual, attributes to which listing records, within the listings tables 44, may be linked. Also, the attributes table 52 may describe a number of real, or actual, attributes to which categories, within the category table 50, may be linked.

The database 40 may also include a note table 54 populated with note records that may be linked to one or more listing records within the listings tables 44 and/or to one or more user records within the user table 42. Each note record within the note table 54 may include, inter alia, a comment, description, history or other information pertaining to a listing being offered via the network-based commerce system 10, to a user of the network-based commerce system 10. The database 40 may also include a targeted site table 56 populated with targeted site records that may be linked to one or more listing records within the listings tables 44 and/or to one or more user records within the user table 42.

A number of other exemplary tables may also be linked to the user table 42, namely a user past aliases table 58, a feedback table 60, a feedback details table 62, a bids table 64, an accounts table 66, and an account balances table 68. In one embodiment, the database 40 also includes a batch table 70, a batch listings table 72, and a listings wait table 74.

Exemplary Application in Online Web Services

Figure 4:
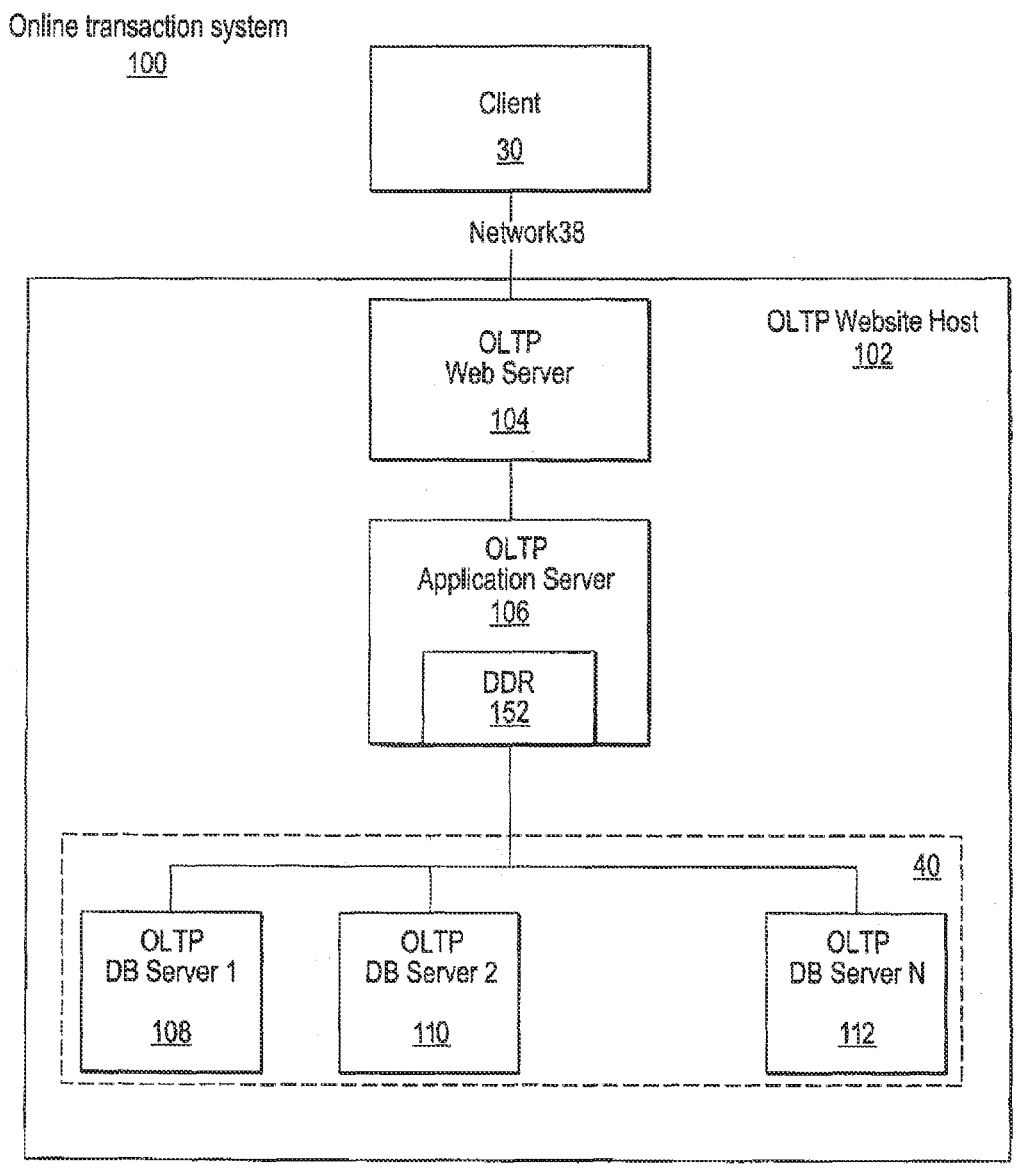
FIG. 4 is schematic block diagram illustrating an exemplary network-based commerce system or facility, also in accordance with an embodiment of the invention, for providing web services in an online transaction processing environment.

Reference numeral 100 (see FIG. 4) generally indicates a network-based commerce system or facility for providing web services in an online transaction processing (OLTP) environment. The system 100 includes a plurality of clients 30 (only one of which is shown in the drawings) connected via a network to an online transaction processing web site host 102. The web site host 102 includes a web server 104, an application server 106, and one or more database servers 108, 110 and 112. It is to be appreciated that the number of database servers will depend on the quantum of data to be stored and may be horizontally distributed. In one embodiment, the web site host 102 may substantially resemble the system 10 (see FIG. 1).

The client machine 30 may be a computer system that enables a user to interact with network-based commerce system 102. The network may be a communications network, such as a LAN, WAN, intranet or the Internet 38. The web site host 102 may be a system for hosting a network-based commerce system web site (e.g., online auction website, trading Web site, etc.). The web server 104 may be a computer system that provides World Wide Web services, for example, to deliver Web pages using a markup language. The application server 106 may be a computer system that provides support for functions required by the web site host 102, such as receiving and processing transaction requests received by the web site host 102. Each database server 108-112 may be a computer system (e.g., storage area network (SAN)) that stores and maintains databases, tables and other data structures as described herein. The web site host 102 may comprises one or more servers, which may be physically co-located or distributed in a distributed computing architecture. The application server 106 may include a Data Dependent Routing (DDR) module 152 (see FIG. 7), in accordance with one aspect of the invention. As described in more detail below, the DDR module 152 may identify, for a given request, which database servers 108-112 the request should be routed to, based on information content included within the request.

In the exemplary embodiment, the client machine 30 may utilizes a web browser 36 to interact (e.g., navigate, add remove, modify and/or view listings) with web site host 102 via the network. In one embodiment, the application server 106 may receive a data transaction request (e.g., a request to read and/or write data to the database servers 108-112) from client machine 30 via the web server 104. The application server 106 may process one or more requests from the client machine 30 by extracting information from and/or storing information in databases within database servers 108-112. A response may be transmitted back to client 30 via the Internet 38. In another embodiment, via techniques well known to those skilled in the art, the client machine 30 may be configured to communicate directly with the application server 106 or the database servers 108-112 when requesting a read and/or a write to the database servers 108-112. As mentioned above, the web site host 102 may be an exemplary configuration of the system 10 when configured for application in a web-based environment.

Figure 5:
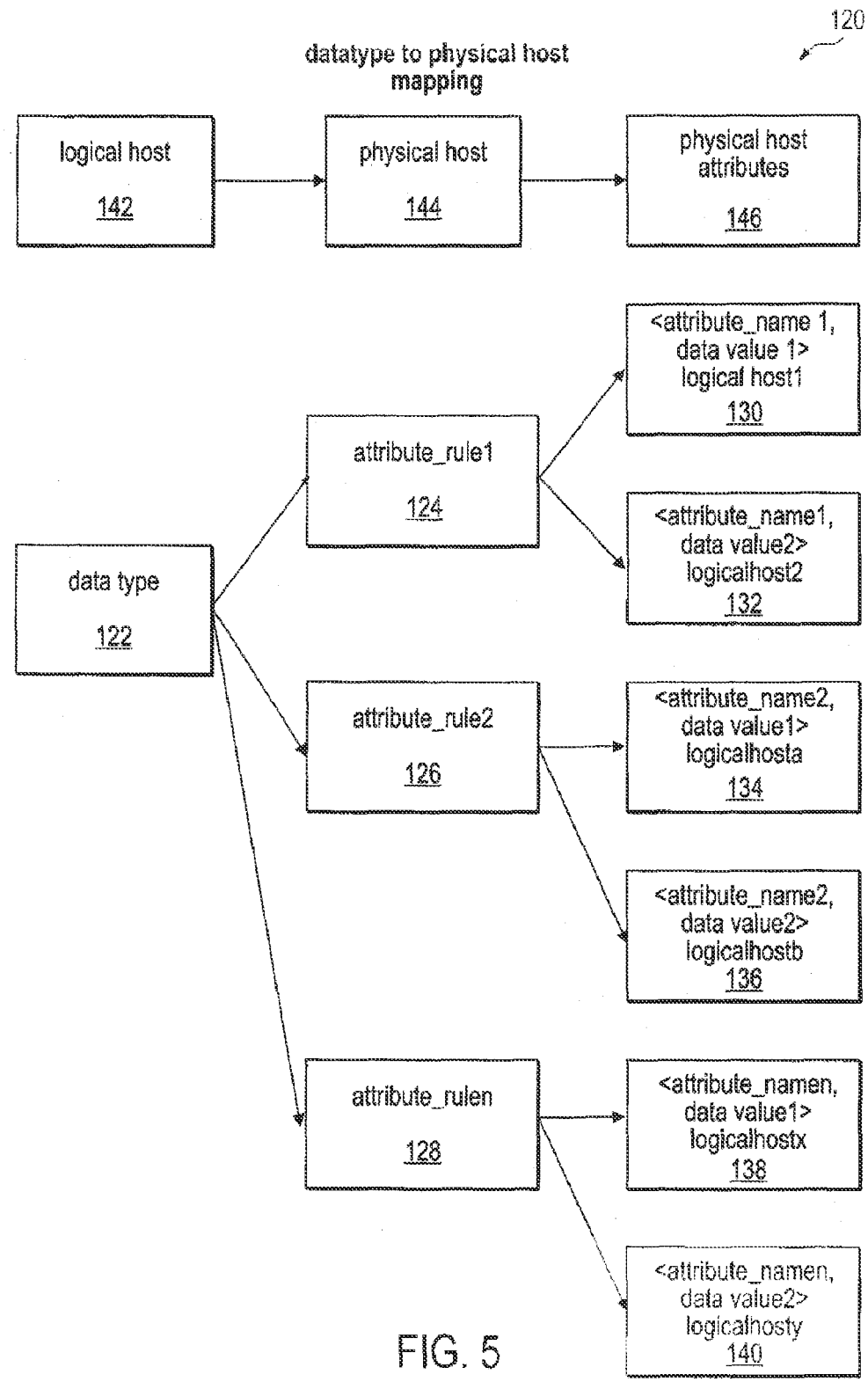
FIG. 5 is a diagram illustrating exemplary data mapping, in accordance with an embodiment of the invention.

Referring in particular to FIG. 5, reference numeral 120 generally indicates exemplary mapping, in accordance with the invention, of a datatype to a physical host. As described in further detail below, the mapping functionality may be performed in a DDR module. In one embodiment, the DDR module 152 contains information about a datatype 122 (e.g., listing data, user data, feedback data, account data, etc.—see FIG. 2) that is being requested. In one embodiment, all knowledge of where the datatype 122 resides is stored in the DDR module 152. Associated with a datatype 122 may be one or more rules that define where the datatype is to be routed and what its physical representation looks like. By way of example, these rules may be embodied in an attribute_rule1 124, an attribute_rule2 126, and so on until an attribute_rulen 128. Although the attribute rules may be complex combinations of various attributes of the datatype, in FIG. 5 the exemplary attribute rules are simplified to include an attribute_name and data value pairs. It is, however, to be appreciated that the rules may vary from one embodiment to another.

For a given datatype 122, the exemplary attribute_rule1 124 may map an exemplary attribute_name1 and data_value1 pair 130, to a logical_host1, and an exemplary attribute_name1 and data_value2 pair 132, to a logicalhost2. Likewise, the exemplary attribute_rule2 126 may map an exemplary attribute_name2 and data_value1 pair 134, to a logicalhost a, and an exemplary attribute_name2 and data_value2 pair 136, to a logicalhost2 136, and so on. Accordingly, each datatype 122 may thus be associated with a logical host 142. For example, a datatype "listings" may be represented as listing_table (see FIGS. 2 and 3) in logical host x, and listing_view in a logical host y. Each logical host 142 may then be mapped to one or more physical hosts 144 according to given attributes 146. Some examples of a physical host attributes are whether the host is a read only host, a read and write host, the data's currency (e.g. up to date, x hours old, x days old), and the actual state of the host (e.g., system load, connect string, etc).

In one embodiment, the attribute_name associated with an attribute rule is an identifier such as an identification number (e.g., 052100, 100401, etc.) or an identifying description (e.g., baseball glove, model car, etc.) associated with the datatype 122. For example, in the exemplary network-based commerce system 10, the attribute_name may be a listing_id field or a listing_description field. The listing_id field may be a numeric field and the listing_description field may be a character field.

Data value pairs associated with an attribute_rule 124-128 may provide a range (e.g., a numeric range). For example, attribute_rule1 124 may provide that listings with an attribute_name1 (e.g., listing_id) between data value1 (e.g., 1) and data value2 (e.g., 1,000,000) reside in an identified logical host (e.g., listinghost1). In the example, the logical host (e.g., listinghost1) may be mapped to one or more physical hosts 144 and, depending on the request (e.g., attribute rule, attribute_name, physical attributes, etc.), the DDR module 152 may determine at which physical host 144 and table the requested data is located. In the exemplary embodiment, upon determining the location, the DDR module 152 can provide the requestor with the correct address and connect string to get the requested data located, for example, in the database servers 108-112.

As mentioned above, the DDR module 152 may enable access to data based on how current the data is (e.g. up to date, x hours old, x days old) and the state (e.g., system load, connect string, etc) of the physical host 140 at which the data is located. In one example, physical attributes associated with a data request provide for directing a first request to update the requested data to a different physical host than a second request to read the requested data. In another example, the physical attributes associated with a data request provide for directing a first request to read the requested data to a different physical host than a second request to read the requested data, where the currency requirement of the second request is not equal (e.g., currency=yesterday) to the most current copy of requested data.

In one embodiment, if the system load (e.g., load balancing) is to be considered as part of a data request, then the DDR module 152 may map the logical host 142 to the physical host 144 according to a load-balancing policy (e.g., round-robin policy, load-based policy, user-defined policy/formula, etc.).

To facilitate load balancing, on-the-fly fail-over, and system reconfigurations, the DDR module 152 may monitor the state of the properties of each physical host 144. The properties of each physical host 144 may include whether it contains the primary write data or a copy, a database type (e.g., Oracle, Sybase or SQL server), a version of the database and user defined properties (e.g., connect string, virtual IP, etc.). In one embodiment, the state and properties of each physical host may be monitored by keeping track of the health of each database server 108-112, the load of each database server 108-112, and the freshness (e.g., age) of any read-only copies of primary write data. The state of the physical hosts 144 may be received via periodic notifications of relevant events from an external systems monitoring module. Any changes in the state of a physical host 144 may be reflected in the DDR module 152 and requests may be routed accordingly.

In one embodiment, the DDR module 152 allows for the partitioning or re-partitioning of data, via attribute rule changes, within database servers 108-112 without bringing down the physical hosts 144 (e.g., the database serves 108-112) of the network-based commerce systems 10. Also, new datatypes and/or data sources may be added through updating information (e.g., datatypes, attribute rules, etc.) within the DDR module 152 to reflect a new datatype and/or data source without bringing any of the applications down.

In one embodiment, the data used by the DDR module 152 may be stored externally (e.g., in a file, a directory service, a database, or the like). In order to enhance performance, the relevant data may be cached locally on each application server 106 and re-cached on certain events. An efficient in-memory representation of the directory information may be provided so that directory lookups are not needed for every transaction to be executed. Although the DDR module 152 in one embodiment may perform two distinct mappings (datatype–>physical table+logical host and logical host–>physical host), for efficiency these two lookups may be collapsed wherever possible.

Figure 6:
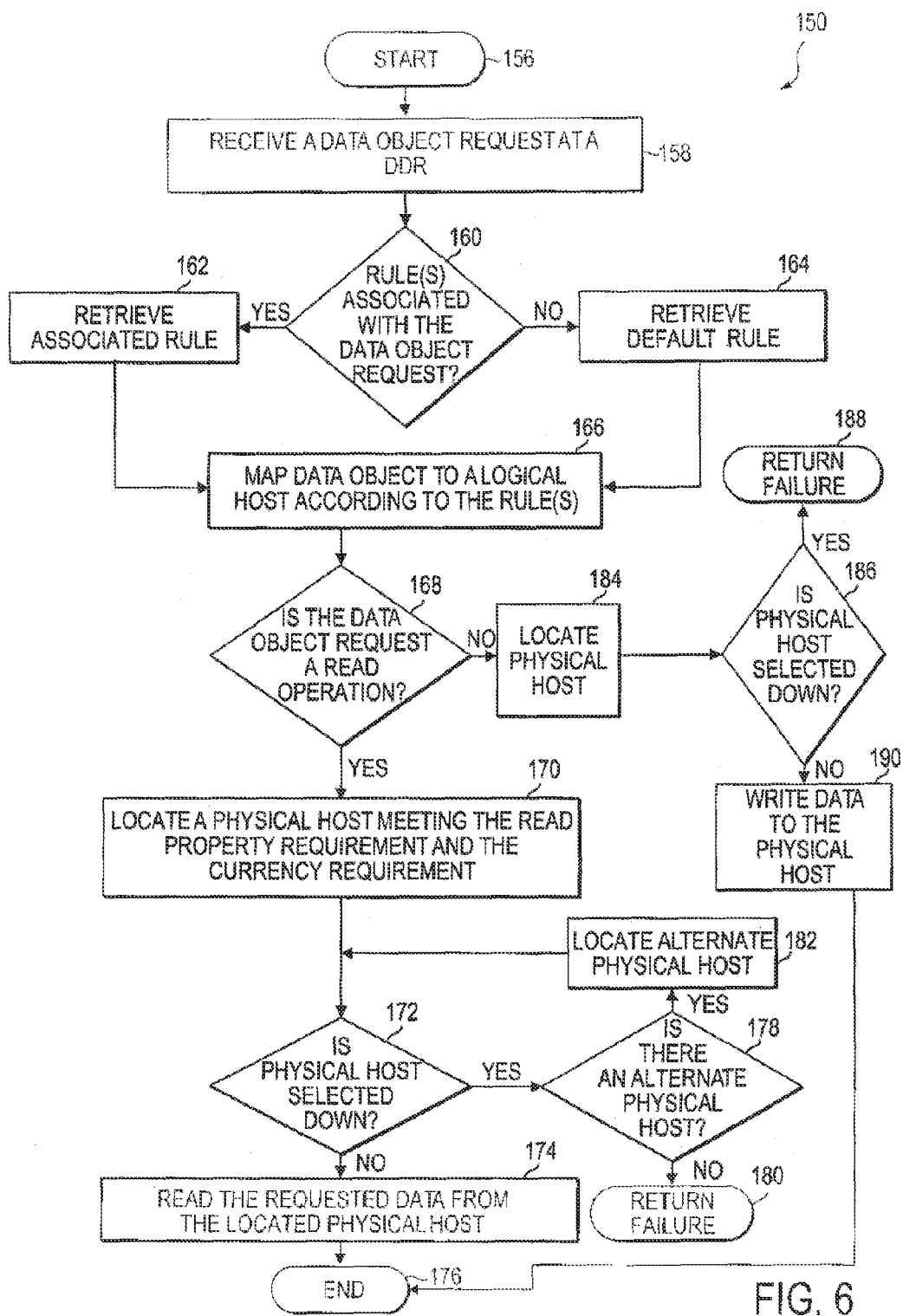
FIG. 6 is a schematic flow diagram illustrating a method, in accordance with an embodiment of the invention, to process data request transactions or requests in a data processing system.
Figure 7:
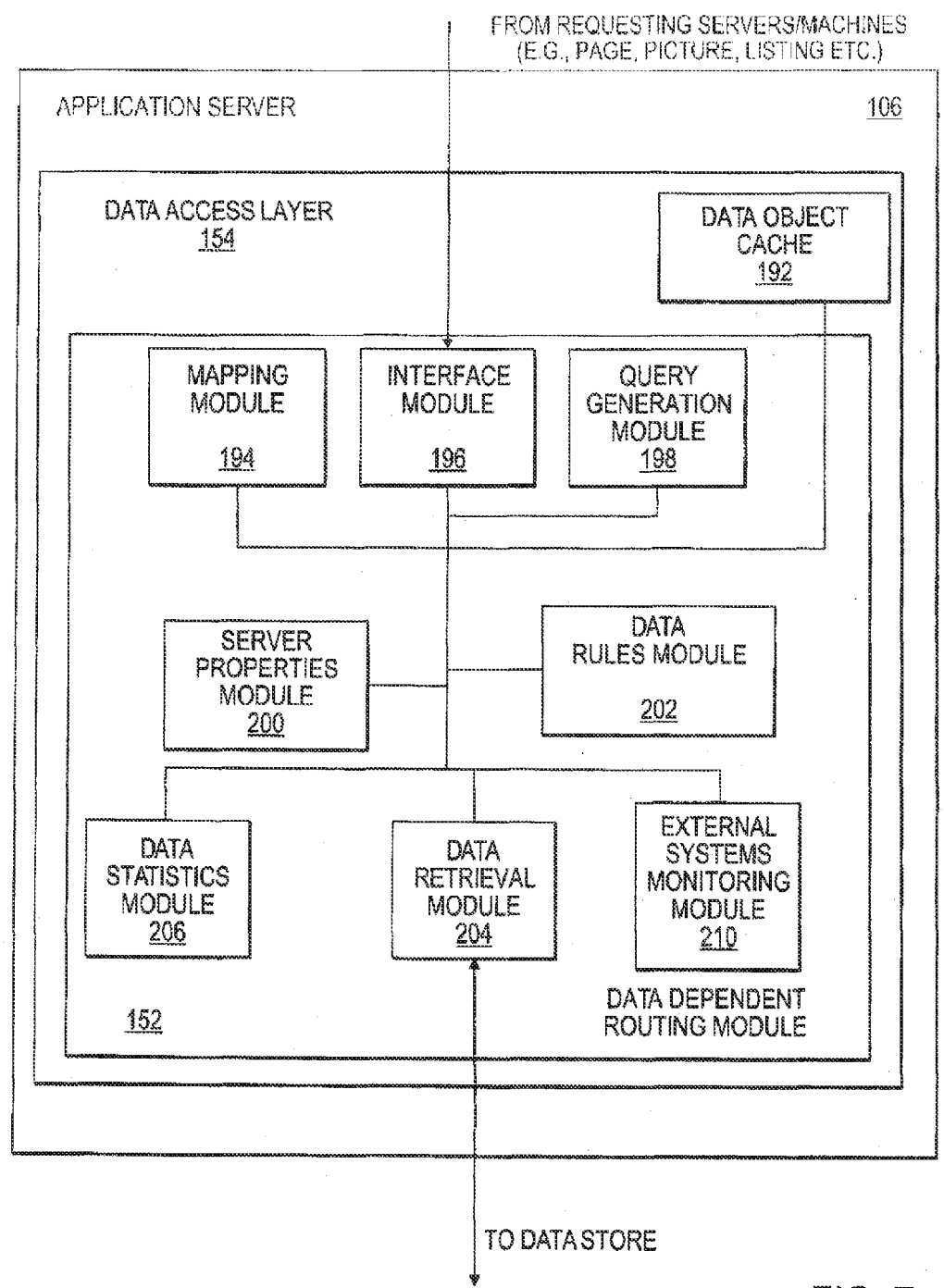
FIG. 7 is a diagram illustrating an exemplary embodiment of a Data Dependent Routing (DDR) module, in accordance with an embodiment of the invention.
Figure 8:
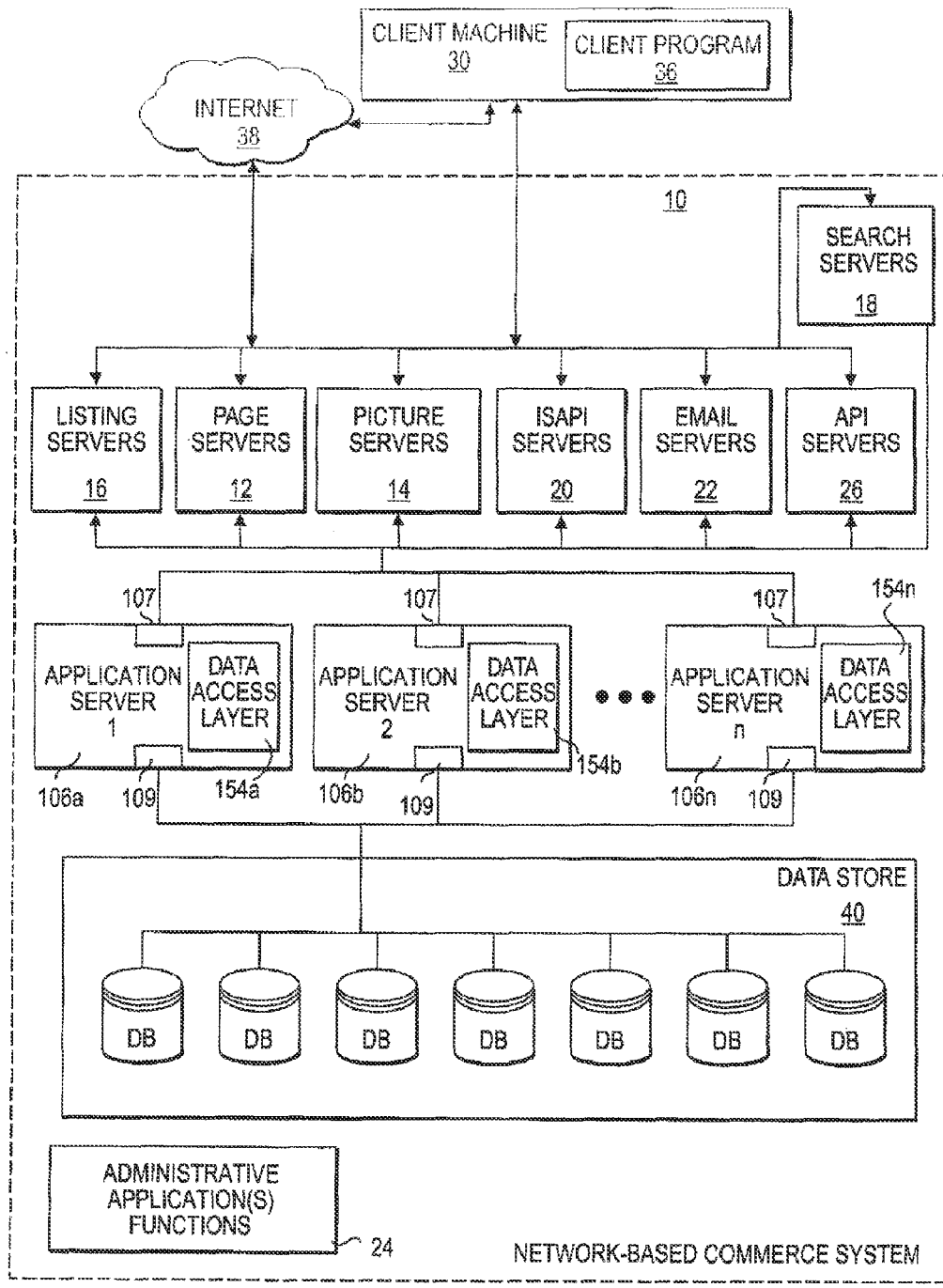
FIG. 8 shows a schematic block diagram of exemplary system architecture for implementing the method of FIG. 6.

FIG. 6 is a flow chart illustrating a method 150, according to an exemplary embodiment of the present invention, of handling or processing a data transaction request in data processing system. The method 150 is described, by way of example, with reference to the exemplary DDR module 152 (see FIG. 7) provided, for example, on the application server 106. As shown in FIGS. 7 and 8, the DDR module 152 may form part of a data access layer 154 that defines an abstraction layer. The application server 106 may include a computer interface module 107 to interface the application server 106 to one or more computers (e.g. servers), and a data store interface module to interface the application server 106 to a data store (e.g., a database engine server of a database store).

Returning to FIG. 6, the method 150 commences at operation 156 and, thereafter at operation 158 a data transaction request (also referred to herein as a data request e.g., a request to read data or to write data) is received. When the method 150 is applied in the network-based commerce system 10 as described above by way of example, the data request may include a datatype (e.g., listing), an attribute_name (e.g., listing_id), physical attributes, or the like. The data request may be for a listing_title, a listing_seller, and/or a listing_sale_end_date, where the requested data is associated with the datatype listing. In the above example, the listing_title, listing_seller and listing_sale_end_date may be data objects or data fields.

After a data request has been received, then at decision operation 160, the method 150 determines if there are any rules associated with the data request. As shown at operation 162, if a rule is associated with the data request, then the associated rule is retrieved. For example, the method 150 may determine at decision operation 160 whether or not an attribute rule applies to the data request. The attribute rule may be retrieved based on the datatype, attribute_name value (e.g., listing_id=052100) and physical attribute(s) associated with the data request. If, however, a determination is made that no rule or rules (e.g., attribute rules) apply, then at operation 164 a default rule is retrieved. In certain embodiments, if no default rule applies, then a failure may be returned in response to the data request.

Once an associated rule has been retrieved at operation 162, or a default rule has been retrieved at operation 164, a data object is mapped to a logical host according to the rule that has been retrieved (see operation 166). In one embodiment when the rule is an attribute rule, the retrieved attribute rule may be applied in order to determine the logical host at which the requested data is located. A logical host may be simply an abstraction for a data source.

At decision operation 168, a determination is made as to whether the data request is a data read request or a data write request. If it is a read request, then at operation 170 the physical host with the most current copy of the requested data is utilized in fulfilling the read data request. For example, the physical host meeting the read property requirement and the currency requirement may be located. For read requests, the properties of the physical host to be selected, such as its load and distance from the requestor, etc., may be considered. Thereafter, at decision operation 172, a determination is made as to whether or not the selected physical host is up or down. If, the physical host is not down, then as shown at operation 174 the requested data is read from the located physical host and the method 150 terminates at operation 176.

Returning to decision operation 172, if the physical host is down, then at decision operation 178 a determination is made as to whether or not there is an alternate physical host available. If there is not an alternate physical host available, a failure may be returned at operation 180. If, however, there is an alternate physical host, then the alternate host is located at operation 182 and the method 150 returns to decision operation 172.

Returning to decision operation 168, when the data request is a write request, then at operation 184 the physical host at which a write copy of the requested data is located, is utilized in fulfilling the write data request. With regard to a write request, an assumption may be made that there is only one write master copy and multiple copies of the data for each unique dataset. However, it is to be appreciated that this functionality can be extended to multiple write masters where the write copies are synchronized at databases 108-112.

After the physical host has been located and selected at operation 184, then at decision operation 186 a determination is made as to whether or not the located physical host is up or down. If the selected physical host is down, then at operation 186 a failure may be returned. If, however, the located physical host is not down, then at operation 190 data is written to the physical host as per the request.

In one embodiment, the data request may be rewritten as a query (e.g., SQL) that provides access to the requested data. Upon issuing the query, the requested data may be read or written according to the type (e.g., read or write) of data request. As the data may be partitioned across multiple database instances, the query may have to be executed against multiple database instances and query results may need to be aggregated.

As mentioned above, the DDR module 152 (see FIG. 7) may be used to implement the method 150. In one embodiment, the DDR module 152 forms part of a data access layer 154 having a data object cache 192. The DDR module 152 includes a mapping module 194 for mapping a datatype to a physical host (see FIG. 5), an interface module 196 to interface the DDR module 152 to one or more requesting server (e.g., the page server 12, picture server 14, listing server 16, search server 18 and ISAPI server 20 shown in FIG. 1), and a query generation module 198. Further, a server properties module 200 and a data rules module 202 may be provided. The data rules module 202 may, for example, define rules used for routing the data requests (e.g., using attributes as described above with reference to FIG. 5). A data retrieval module may then retrieve data from a data store (e.g., the database 40 in FIG. 1). In certain embodiments, a data statistics module is provided to provide statistics on the data routing and an external systems monitoring module 210 may also be provided. The modules 194-210 of the DDR module 152 may execute the functionality described above with reference to the method 150.

In one embodiment, the DDR module 152 may facilitate load balancing, fast fail-over, and/or support future splits for scalability. Multiple databases 40 (see FIG. 8) may be provided at the back end. It is to be appreciated that the databases may be configured for different applications of the invention. For example, some of the databases may be replicas of one another, some may be read only subsets of one another (e.g., on-demand caches), some may be primary database(s) of record, and so on. The data may be stored in different tables and/or instances according to the data itself and may be used to map requests for objects to specific database objects in specific database instances.

Thus, exemplary applications of the DDR module 152 and the method 150 may be:
1. To load-balance between read-only replicas, on demand caches and between read/write databases.
2. To split databases on the fly with reduced or no code changes in the application business logic.
3. To provide fast fail-over where the primary (write) database has failed or is being shut down for maintenance.

Exemplary types of data distributions (or data splits), each optionally having their own constraints, are as follows:
1. Split by functional area. For example, feedback related tables may be in a separate feedback database instance, this type of split may be possible when each functional area does not greatly impact other functional areas in an application, for example, account information does not greatly impact on feedback information, thus they may be easily separable.
2. Split by modulus of size of a column of a table. For example, XXXX_accounts may split into 10 tables based on modulus of the id of the user. Thus XXXX_accounts may be split into XXXX_accounts_0 to XXXX_accounts_9. In one embodiment where aggregate information of all items on the network-based commerce system 10 are gathered, requests may be split to the different database instances and the results may be then gathered to present to the users. The data access layer 154 of an application (e.g., of the application server 106 (see FIG. 7) may perform this function. In one embodiment, a temporary indicator in a user record may be provided to indicate whether the user has been split. Accordingly, users may be split across different databases while the system 10 is up and running. Fixed temporary flags may be reserved (which may be reusable after all the splits are completed) in user records to act as indicators for this type of split. In certain embodiments, while this type of split can be abstracted from the application business logic, the data access layer may need to perform this function. Further splits of this type may be supported. For examples, mod 17, mod 100, and so on may be provided.
3. Split by some time lapse, e.g. XXXX_items may be split in an archive database to XXXX_items_mmyy, where mmyy indicates the month and year of the item's sale end. If the item's sale end is not known, the table(s) to go to can be determined. For active items, the active item tables may be interrogated; for items that have ended, if the item is not found in the active table, or if a hint of the sale end of the item is provided, the process may proceed directly to the specific archive table, or allow the data access layer to go back several months from the current month to find the item.
4. Split by some grouping into separate instances based on some critical data values. For example, for a listing or item split, listings or items may be split into separate instances, each instance may be for a specific category group, having the same set of tables. Items may also be identified by item id ranges to indicate which category group it belongs to. For example, each of the item split hosts may have XXXX_tems, XXXX_item desc and XXXX_bids. In one embodiment, this may require that all tables for different category groups reside in different database instances because the names of the tables may be identical. For requests that need to go across all instances, the data access layer of the application may perform this function and isolate the business logic layer from this knowledge. In certain embodiments, other type(s) of splits may be supported. For example, feedback_detail may be split based on the feedback score of the user, based on type of feedback detail, etc. In certain embodiments, even though items are split based on category groups, item_description may reside in a totally separate instance. Denormalized, special purpose replicas for specific purposes may be provided.

In one embodiment, the exemplary DDR module 152 may include the following information:
1. Logical database host information. Logical hosts may provide insulation between the application and an actual physical database instance. The application data access layer may refer to logical hosts for its requests, e.g. UserHost. The concept of logical host may be an abstraction used to support failure of the primary physical host and what the retry host, if any, should be, what the reanimate time is (e.g., if a host is down, a check may be required to determine if the host is up in x minutes), etc.
2. Physical host information, e.g. UserHostPhysical and related user information as well as whether it is a primary or read copy.
3. Physical host state information such as whether the host is up or down; if it is up, how current it is; this information may be injected from a system management module that monitors the state(s) of the database(s).
4. Mapping of application level data access objects to physical tables, mapping of physical tables to the logical host and the physical host of the database. This may facilitate splitting of tables in the various methods mentioned above. In one embodiment for this purpose, a layer of abstraction with the concept of logical tables may be introduced. A logical table may be a synonym for a group of tables. Those tables can be physically partitioned into separate physical tables (either with different names—such as referring to the group of tables associated with XXXX_items_arc_mmyy, or XXXX_accounts_x, or with the same names —such as XXXX_items that are split across multiple database instances) or it can be a single table (such as XXXX_feedback).

An example of the mappings in the above four types of splits may be:

1. Mapping of feedback_detail (logical object) to XXXX_feedback_detail logical table on fdbk logical instance. This is a simple type of mapping–<object, attribute=<logical table, logical host, column>pair, with attributes of the object mapping directly to physical columns in the table(s). For instance, the User object may be mapped to two separate tables logically; thus the attributes of a User could be mapped to a <table, host, column> pair depending on the attribute itself.

2. Mapping of account (logical table) to physical table XXXX_accounts_x (or XXXX_accounts if we are in transition) given a userid parameter (and, temporarily while the migration is going on, the user temporary flag indicator) and the currency mode required. The mapping may be:
<logical table, currency requirement, <attribute_name, attribute_value, datatype>> maps to a list of one or more <Physical table, list<column_name, attribute_name, attribute_value, datatype>, logical host>.

3. The mapping of logical table to a physical table and the mapping of a physical table to a logical host may be done according to the rules that apply to different logical/physical tables.

In one embodiment, information stored in the DDR module 152 may be normalized and stored in a denormalized fashion in an application for faster lookup. For example, the following information may be kept associated with the following concepts:

Logical host: required: name, hostRule; optional: description.
E.g. name=UserHost,
hostRule=sequential (sequential physical host list mapping).
In other embodiments, other hostRules may be defined.
Physical host: required: name, instanceName, type (Oracle, SQL server, db2); optional: userpwd, retrycount, delay, reanimate, currency, description. Currency may either denote the write primary or the read replicas, where read replicas may have a rating of current, almost-Current, notCurrent. These ratings may, however, be expanded to incorporate some type of timestamp.
For example:
name=UserHostPhysical,
instanceName=usr,
type=oracle,
userpwd=XXXXuser,
retrycount=3,
delay=5,
reanimate=1,
currency=writePrimary.
HostList may be a ranked list of physical Hosts that may be used for load balancing between read hosts.
Logical to physical host mapper. required: logical host name–>HostList.
E.g. UserHostRead–>{(1, UserHostPhysical), (2, UserHostRetryPhysical)}.
Logical table: required: name, attributes list, matching rules and their associated attribute/value lists, optional: effective date, description. The result may be a corresponding physical table.
Physical table: required: name, attribute list, matching rules and their associated attribute/value lists. The following may be optional: description, effective date. The result may be a logical host.

The following exemplary classes may be provided:
ddrMgr—Main interface class to DDR functionality
ddrPopulate—"Helper class to load DDR information from a data store
ddrTouple—Storage class used to return information from DDR
ddrColumn—Storage class used to pass information to DDR, and also
part of ddrTouple In one embodiment, the DDR module 152 may perform one or more of the following functions:
Mapping of business objects to data objects
Enabling data partitioning (both by type and value)
Enabling access to the data based on currency needs and load
Enabling on-the-fly fail-over and system reconfigurations.
The data used by the DDR module 152 may be stored externally (file, directory service or similar), but in order to enhance performance, relevant data may be cached locally and re-cached on certain events.

In one embodiment an in-memory representation of the directory information may be provided to avoid directory lookups (or read a file, etc.) for every transaction that is to be executed. Although several distinct mappings (object to a logical table, logical table to physical table, physical table to logical host, logical host–>physical host) may be performed, it may be desired to collapse these lookups wherever possible. This may result in denormalized information placed in memory.

In one embodiment, the in-memory structures may be arranged in inverted trees where decisions are first made depending on currency requirements and read/write access, and then on a logical table name. Required attributes as well as any attribute/value pairs may be used to decide which tables, which columns in the tables and which logical and physical hosts to return. An exemplary description is as follows:

Split search tree on currency:
Lookup in by currency results in a map of logical tables
map[currency]–>map[logical tables]
Thereafter a lookup in a map of logical tables may be performed using a rule that is attached to the logical table. The rule may have a list of relevant attributes to consider. Based on the values of those attributes and the operations that are defined in the rules, a list of physical tables that apply may be generated.

Thereafter, a logical host may be obtained and the rule that is attached to the physical table may be used. The rule may have a list of relevant attributes and the operations to perform on them. Based on the results of those rules, the logical host for the physical table may be obtained.

Finally, the logical host may be mapped to a physical host based on the configuration information. The result of such a request may be all the necessary information to generate and execute a query physical table, list of columns, logical host and a physical host.

Exemplary Rule Descriptions

In one exemplary embodiment, rules may map a logical table to a physical table, and map a physical table to a logical host. A rule may, for example, include one or more of a name, a logical table, an attribute name, an operation, and a result. The result may be a name, (e.g., a name of a physical table or a name of a logical host). The operation may be one or more of a modN, a substring, a concat, a union, an AND operation, an equal operation, a range, a string match or other user defined operations. The operation may apply to either an attribute or the result of other rules.

In one embodiment, in order to resolve a logical table mapping, a logical table should be mapped to a physical table, a logical host, and then the logical host is mapped to a physical host. A result of a rule can be either null, unique or a list of values.

Mapping of a Logical Table to a Physical Table

An example of mapping of a logical table to a physical table is as follows:

```
Rule A:
    Logical table name: XXXX_items
    Attribute: none
    Operation: none
    Value: XXXX_items
Rule B:
    Logical table name: XXXX_items
    Attribute: sale_end || now
    Operation: substring(mmyy)
    Value: concat(XXXX_items_arc_(result of operation))
Rule C:
    Logical table name: XXXX_items
    Attribute: sale_end || now
    Operation: substring((sale_end-1 month) mmyy || (now-1 month) mmyy)
    Value: concat (XXXX_items_arc_(result of operation))
Rule D:
    Logical table name: XXXX_items
    Attribute: sale_end || now
    Operation: substring((sale_end-2 months) mmyy || (now-2 months) mmyy)
    Value: concat (XXXX_items_arc_(result of operation))
Rule F: union ((rule A, rule B, rule C, rule D)
```

So for XXXX_items, rule A may produce the XXXX_items (active table) and rules B-D may produce XXXX_items_arc_mmyy tables (e.g., going back 3 months).

Exemplary rules for accounts are as follows:

```
Rule A:
    Logical table name: XXXX_accounts
    Attribute: id
    Operation: mod10
    Value: concat (XXXX_accounts_(result of operation))
```

If, for example, XXXX_accounts_n are split further by year, then the following rules may be added:

```
Rule B:
    Logical table name: XXXX_accounts
    Attribute: when
    Operation: substr(yy)
    Value: concat(_(result of operation))
Rule C:
    Logical table name: XXXX_accounts
    Rule A union rule B(result of rule A)
```

Exemplary rules for feedback are as follows:

```
Rule A:
    Logical table name: XXXX_feedback
    Attribute: none
    Operation: none
    Value: XXXX_feedback
```

Mapping Physical Table to a Logical Host

An example of rules for mapping physical table to a logical host is as follows:

```
Rule A:
    Physical name: XXXX_items
    Attribute: id
    Operation: range
    List of values and their corresponding mapping (for example, id in a range of 1 and 1,000,000,000 host itemsHost1)
Rule B:
    Logical table name: XXXX_items
    Attribute: category_group
    Operation: equal
    List of values and their corresponding mapping (for example category group 1 host itemsHost1)
Rule C:
    Logical table name: XXXX_items
    Attribute: id || categoryGroup
    Operation: rule B or rule A
Rule A (for XXXX_items_arc_mmyy)
    Physical table name: XXXX_items_arc_mmyy
    Attribute: none
    Operation: none
    Value: hostArc
Rule A (for XXXX_feedback)
    Physical table name: XXXX_feedback
    Attribute: none
    Operation : none
    Value: feedbackHost
Rule A (for XXXX_accounts_0)
    Physical table name: XXXX_accounts_0
    Attribute: none
    Operation: none
    Value: accountsHost
```

Mapping a Logical Host to a Physical Host

Finally, a logical host may be mapped to a physical host:

```
mapping A:
    Logical host : itemHost1
    HostRule: single
    Value: thisItemHost1
mapping B:
    logical host: userHost
    HostRule: sequential
    Value: (thisUserHost, thatUserHost)
```

Exemplary Mappings and Splits

The following is a sample mapping of an exemplary clsItem object on insert before a split:

```
mapping of object to logical table list
    input:
        clsItem, <id=123, title="test", category=23, seller=1234, sale_end=next week, description="very nice item">
    output:
        logical table XXXX_items, <id=123, title-"test", category=23, seller=1234,
            sale_end=next week>
        logical table XXXX_item_desc, <id=123, desc_length=15, desc="very nice item">
mapping of logical table to physical table, logical host
input:
        XXXX_items, <id=123, title="test", category=23, seller=1234, sale_end=next week>
    output:
        XXXX_items, <id=123, title="test", category=23, seller=1234, sale_end=next week>,
                                    logical host=default
matching rule:
```

-continued

```
    id < 55555 physical table: XXXX_items, logical host: CLOM
    any id && sale_end < yesterday physical table:
XXXX_items_arc_mmyy,
        logical host: archive where mmyy are the month and year of
        sale_end
        XXXX_items.category_group=0 -> assign id < 55555,
XXXX_items, logical host CLOM
mapping of logical host to physical host:
    input: logical host=default, currency=write
    output: physical host=itemsHostDefault
```

In the event of the rule being changed the following lines may be added:

```
    123 < = item.id < 55555 physical table: XXXX_items, logical host:
very new item host
        XXXX_items.category_group=1 -> assign 123 =< id < 55555,
XXXX_items, logical host very new item
    output: physical host=itemsHostDefault
```

The following is a sample mapping of an exemplary clsItem object on insert after a split:

```
mapping of object to logical table list
    input:
        clsItem, <id=123, title="test", category=23, seller=1234,
sale_end=next week,
                                description="very nice item">
    output:
        logical table XXXX_items, <id=123, title="test", category=23,
seller=1234, sale_end=next week>
        logical table XXXX_item_desc, <id=123, desc_length=15,
desc="very nice item">
mapping of logical table to physical table, logical host
    input:
        XXXX_items, <id=123, title="test", category=23, seller=1234,
sale_end=next week>
    output:
        XXXX_items, <id=123, title="test", category=23, seller=1234,
sale_end=next week>,
        logical host=very new item host
matching rule:
    item.id < 123 physical table: XXXX_items, logical host: default
    123 < = item.id < 55555 physical table: XXXX_items, logical host:
very new item host
    any id && sale_end < yesterday physical table:
XXXX_items_mmyy, logical host: archive
        XXXX_items.category_group=1 -> assign 123 =< id <
55555, maps to XXXX_items, logical host very new item
        XXXX_items.category_group=0 -> assign id < 123, maps to
XXXX_items, logical host CLOM
mapping of logical host to physical host:
    input:
        logical host=very new item host, currency=write
    output:
        physical host=itemsHostVeryNew
```

The following is a sample mapping of clsItem object on read after the split:

```
mapping of object to logical table list
    input:
        clsItem, <id=123, title=, category=, seller=, sale_end=,
        description=>
    output:
        logical table XXXX_items, <id=123, title=, category=, seller=,
sale_end=>
        logical table XXXX_item_desc, <id=123, desc_length=,
        desc=>
mapping of logical table to physical table, logical host
    input:
        XXXX_items, <id=123, title=, category=, seller=, sale_end=>
    output:
        XXXX_items, <id=123, title=, category=, seller=, sale_end=>,
        logical host=very new item host
        XXXX_items_arc_0501, <id=123, title=, category=, seller=,
sale_end=>,
                                                    logical
host=archiveHost
        XXXX_items_arc_0401, <id=123, title=, category=, seller=,
sale_end=>,
                                                    logical
host=archiveHost
        XXXX_items_arc_0301, <id=123, title=, category=, seller=,
sale_end=>,
                                                    logical
host=archiveHost
    matching rule:
        item.id < 123 physical table: XXXX_items, logical host: default
        123 < = item.id < 55555 physical table: XXXX_items, logical
host:
very new item host
        any id && sale_end < yesterday physical table:
XXXX_items_mmyy, logical host: archive
            where mmyy is three months back starting from current month
    mapping of logical host to physical host:
        input:
            logical host=very new item host, currency=read
        output:
            physical host=itemsHostVeryNewRead
        input:
            logical host=archiveHost, currency=read
        output:
            physical host=archiveItemsHost
```

The following is a sample mapping of clsItem object on read after the split when only the active ones are desired:

```
mapping of object to logical table list
    input:
        clsItem, <id=123, title=, category=, seller=, sale_end>= now,
description=>
    output:
        logical table XXXX_items, <id=123, title=, category=, seller=,
sale_end>=now >
        logical table XXXX_item_desc, <id=123, desc_length=, desc=>
mapping of logical table to physical table, logical host
    input:
        XXXX_items, <id=123, title=, category=, seller=, sale_end=>=
now>
    output:
        XXXX_items, <id=123, title=, category=, seller=, sale_end=>=
now>, logical host=very new item host
matching rule:
        item.id < 123 physical table: XXXX_items, logical host: default
        123 < = item.id < 55555 physical table: XXXX_items, logical host:
very new item host
        any id && sale_end < yesterday physical table:
XXXX_items_mmyy, logical host: archive
            where mmyy is three months back starting from current month
    mapping of logical host to physical host:
        input:
            logical host=very new item host, currency=read
        output:
            physical host=itemsHostVeryNewRead
```

The following is a sample mapping of clsUser object write before the split:

```
mapping of object to logical table list
    input:
        clsUser, <id=123, userid="madguy",
        email="madguy@hotmail.com", score=100>
```

```
        output:
            logical table XXXX_users, <id=123, userid="madguy",
email="madguy@hotmail.com",
                                score=100>
        mapping of logical table to physical table, logical host
            input:
                XXXX_users, <id=123, userid="madguy",
email="madguy@hotmail.com", score=100>
            output:
                XXXX_users, <id=123, userid="madguy",
email="madguy@hotmail.com", score=100>, userHost
        matching rule:
            XXXX_users->userHost
        mapping of logical host to physical host:
            input:
                logical host=userHost, currency=write
            output:
                physical host=userHostwrite
```

In the event of the rule being changed:

```
        XXXX_user.user_indicator < 0 ->XXXX_users, userHost
        XXXX_user.user_indicator >= 0 -
>XXXX_users_(XXXX_user.idMOD10), userHost_new
```

The following is a sample mapping of clsUser object write after the split, but the user is still not moved:

```
mapping of object to logical table list
    input:
        clsUser, <id=123, userid="madguy",
email="madguy@hotmail.com",score=100, user_indicator=-1>
    output:
        logical table XXXX_users, <id=123, userid="madguy",
email="madguy@hotmail.com",
                    score=100, user_indicator=-1>
mapping of logical table to physical table, logical host
    input:
        XXXX_users, <id=123, userid="madguy",
email="madguy@hotmail.com",
                    score=100, user_indicator=-1>
    output:
        XXXX_users, <id=123, userid="madguy",
email="madguy@hotmail.com", score=100, user_indicator=-1>,
UserHost
matching rule:
    XXXX_user.user_indicator < 0 ->XXXX_users, userHost
    XXXX_user.user_indicator >= 0 -
>XXXX_users_(XXXX_user.idMOD10), userHost_new
mapping of logical host to physical host:
    input:
        logical host=userHost, currency=write
    output:
        physical host=userHostWrite
```

The following is a sample mapping of clsUser object read after the split, and the user is moved and there is no indicator:

```
mapping of object to logical table list
    input:
        clsUser, <id=123, userid="madguy",
email="madguy@hotmail.com", score=100, user_indicator=3>
    output:
        logical table XXXX_users, <id=123, userid="madguy",
email="madguy@hotmail.com",
                                score=100,
user_indicator=3>
mapping of logical table to physical table, logical host
    input:
```

```
        XXXX_users, <id=123, userid=, email=, score=, user_indicator=>
    output:
        XXXX_users, <id=123, userid=, email= , score=, user_indicator=>,
userHost
        XXXX_user3, <id=123, userid=, email= , score=, user_indicator=>,
userHost_new
matching rule:
    XXXX_user.user_indicator < 0 ->XXXX_users, userHost
    XXXX_user.user_indicator >= 0 -
>XXXX_users_(XXXX_user.idMOD10), userHost_new
mapping of logical host to physical host:
    input:
        logical host=userHost_new, currency=read
        logical host=userHost, currency=read
    output:
        physical host=newuserHostRead
        physical host=userHostRead
```

If it is desired to to obsolete the indicator column because all the users may have been moved:
Then the following rule may be removed:

```
        XXXX_user.user_indicator < 0 ->XXXX_users, userHost
        and change the remaining rule to:
        XXXX_users -> XXXX_users_(XXXX_user.idMOD10),
userHost_new
```

The following is a sample mapping of clsUser object read after the split, and the all the users are moved:

```
mapping of object to logical table list
    input:
        clsUser, <id=123, userid=email= ,score=>
    output:
        logical table XXXX_users, <id=123, userid=, email=, score=100>
mapping of logical table to physical table, logical host
    input:
        XXXX_users, <id=123, userid="madguy",
email="madguy@hotmail.com",score=100>
    output:
        XXXX_users_3, <id=123, userid="madguy",
email="madguy@hotmail.com", score=100>, userHost_new
matching rule:
    XXXX_users -> XXXX_users_(XXXX_user.idMOD10),
userHost_new
mapping of logical host to physical host:
    input:
        logical host=userHost_new, currency=read
    output:
        physical host=newuserHostWrite
```

The following is a sample mapping of clsFeedback object read:

```
mapping of object to logical table list
    input:
        clsFeedback, <id=123, score=, last_modified=>
    output:
        logical table XXXX_feedback, <id=123, score=, last_modified=>
mapping of logical table to physical table, logical host
    input:
        XXXX_feedback, <id=123, score=, last_modified=>
    output:
        XXXX_feedback, <id=123, score=, last_modified=>, feedbackHost
matching rule:
    XXXX_feedback ->XXXX_feedback, feedbackHost
mapping of logical host to physical host:
    input:
```

```
logical host=feedbackHost, currency=read
output:
physical host=feedbackHostRead
```

Figure 10:
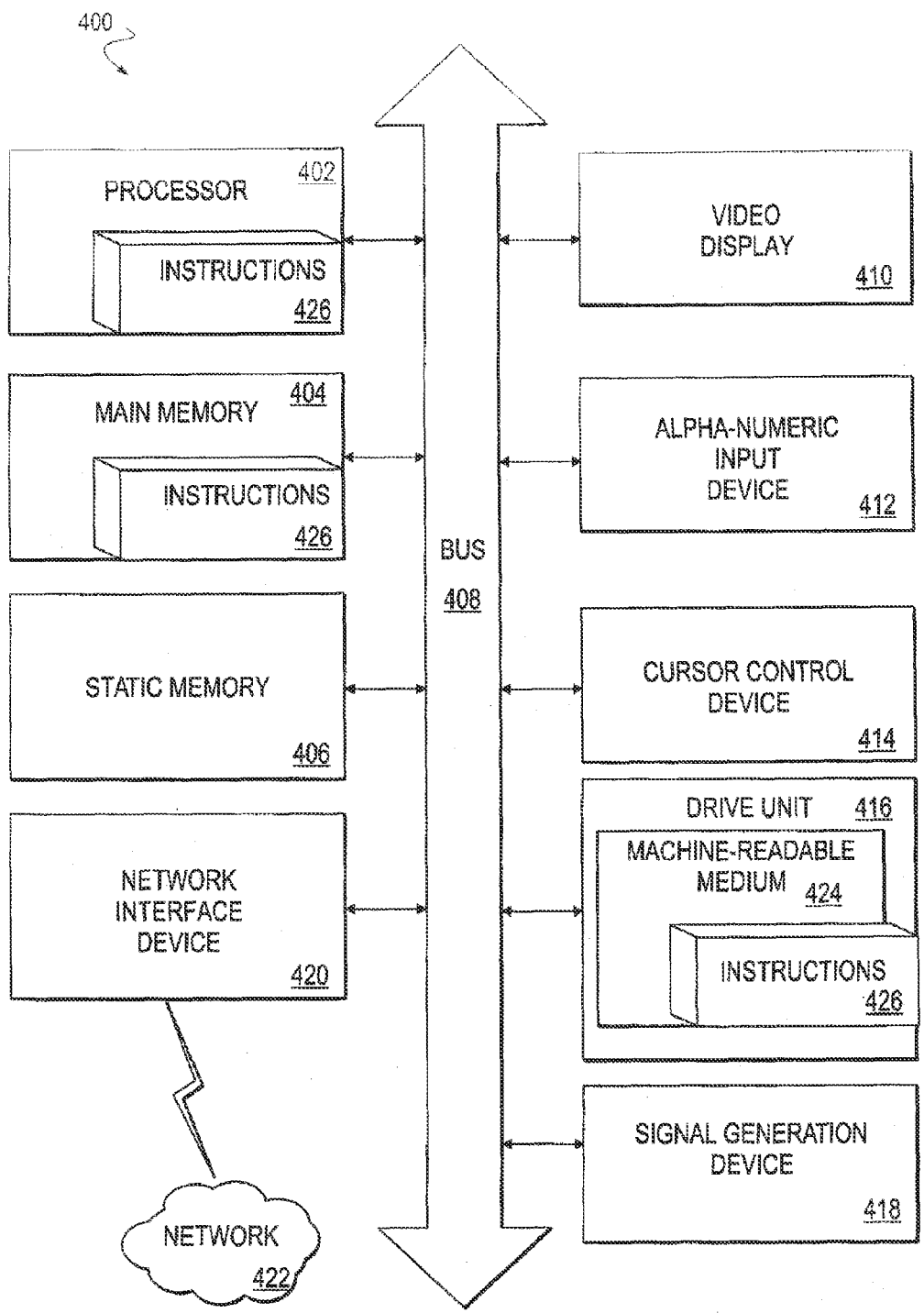
FIG. 10 shows a diagrammatic representation of machine, in the exemplary form of a computer system, within which a set of instructions, for causing the machine to perform any one of the methodologies discussed herein, may be executed.

FIG. 10 shows a diagrammatic representation of a machine in the exemplary form of a computer system 400 within which a set or sequence of instructions, for causing the machine to perform any one of the methodologies discussed herein, may be executed. In alternative embodiments, the machine may comprise a network router, a network switch, a network bridge, Personal Digital Assistant (PDA), a cellular telephone, a web appliance, set-top box (STB) or any machine capable of executing a sequence of instructions that specify actions to be taken by that machine.

The computer system 400 includes a processor 402, a main memory 404 and a static memory 406, which communicate with each other via a bus 408. The computer system 400 may further include a video display unit 410 (e.g., a liquid crystal display (LCD) or a cathode ray tube (CRT)). The computer system 400 also includes an alphanumeric input device 412 (e.g., a keyboard), a cursor control device 414 (e.g., a mouse), a disk drive unit 416, a signal generation device 418 (e.g., a speaker) and a network interface device 420 to interface the computer system to a network 422.

The disk drive unit 416 includes a machine-readable medium 424 on which is stored a set of instructions or software 426 embodying any one, or all, of the methodologies described herein. The software 426 is also shown to reside, completely or at least partially, within the main memory 404 and/or within the processor 402. The software 426 may further be transmitted or received via the network interface device 420. For the purposes of this specification, the term "machine-readable medium" shall be taken to include any medium which is capable of storing or encoding a sequence of instructions for execution by the machine and that cause the machine to perform any one of the methodologies of the present invention. The term "machine-readable medium" shall accordingly be taken to included, but not be limited to, solid-state memories, optical and magnetic disks, and carrier wave signals. Further, while the software is shown in FIG. 10 to reside within a single device, it will be appreciated that the software 426 could be distributed across multiple machines or storage media, which may include the machine-readable medium.

Thus, a method and system to process data requests in a data processing system such as a network-based commerce system 10 have been described. Although the invention has been described with reference to specific exemplary embodiments, it will be evident that various modifications and changes may be made to these embodiments without departing from the broader spirit and scope of the invention. Accordingly, the specification and drawings are to be regarded in an illustrative rather than a restrictive sense.

What is claimed is:

1. A system to process data transactions in a data store including a plurality of databases, the system comprising:
   a computer interface module to receive a data transaction request from at least one requesting computer, the data transaction request being an object oriented request; and
   a data access layer having one or more processors to identify at least one database in the plurality of databases, the plurality of databases being horizontally distributed, the data access layer to define an object oriented abstraction layer between the computer interface module and the plurality of databases.

2. The system of claim 1, wherein the data access layer comprises a plurality of logical hosts and a plurality of physical hosts, the data access layer is further to derive a logical host from the data transaction request and map the data transaction request to a physical host to identify at least one of the plurality of databases.

3. The system of claim 1, wherein the data access layer comprises at least one logical table and at least one physical table, the data access layer is further to identify a logical table from the data transaction request and map the data transaction request to a physical table to identify a corresponding logical host.

4. The system of claim 1, further comprising a data dependent routing module to generate a query to at least one of the plurality of databases that is identified based on content of the data in the data transaction request.

5. The system of claim 4, wherein the data dependent routing module is to identify a data type from the data transaction request and map the data transaction request to an associated physical host based on at least one rule.

6. The system of claim 5, wherein the at least one rule includes at least one attribute used to identify the physical host.

7. The system of claim 4, wherein data associated with a user is split across the plurality of databases and the data dependent routing module is further to identify at least one of the plurality of databases from the data transaction request.

8. The system of claim 4, wherein the data transaction request is an object oriented request and the data dependent routing module is to map the object oriented request to a physical host to identify an associated database of the plurality of databases.

9. The system of claim 1, where the system is part of a network-based commerce facility and the data transaction request is a request associated with items listed in the network-based commerce facility, the data transaction request being communicated between any one of a plurality of client machines and the system via the Internet.

10. A method of processing data transactions in a data store including a plurality of databases, the method comprising:
   receiving a data transaction request from at least one requesting computer, the data transaction request being an object oriented request; and
   using a data access layer that defines an abstraction layer to identify, using one or more processors, at least one database from the plurality of databases, the plurality of databases being horizontally distributed; and
   defining an object oriented abstraction layer between the at least one requesting computer and the plurality of databases.

11. The method of claim 10, wherein the data access layer comprises a plurality of logical hosts and a plurality of physical hosts, the method further comprising:
   deriving a logical host from the data transaction request; and
   mapping the logical host to a physical host that identifies at least one of the plurality of databases.

12. The method of claim 10, wherein the data access layer comprises at least one logical table and at least one physical table, the method further comprising:
   identifying a logical table from the data transaction request; and
   mapping the logical table to a physical table which identifies a corresponding logical host.

13. The method of claim 10, further comprising generating a query to a database that is identified based on content of data in the data transaction request.

14. The method of claim 10, further comprising:
  identifying a data type from the data transaction request; and
  mapping the data transaction request to an associated database of the plurality of databases according to at least one rule.

15. The method of claim 14, further comprising changing the at least one rule in real-time.

16. The method of claim 14, further comprising:
  making a determination if the data transaction request has an associated rule; and
  based on the determination that the data transaction request has the associated rule;
    retrieving the associated rule; and
    mapping the data transaction request to a physical host based on the associated rule.

17. The method of claim 16, wherein mapping the data transaction request to a physical host includes:
  mapping the data transaction request to a logical host based on the associated rule; and
  mapping the logical host to a physical host identifying one of the plurality of databases.

18. The method of claim 14, wherein the at least one rule includes an attribute that is used in identifying a physical host.

19. The method of claim 10, wherein data associated with a user is split across the plurality of databases, the method further comprising identifying at least one database associated with the user from the data transaction request.

20. The method of claim 10, wherein the data transaction request is an object-orientated request, the method further comprising mapping the object-orientated request to a physical host, the physical host identifying an associated database of the plurality of databases, 21. The method of claim 10, further comprising:
  making a determination if the identified database is down; and
  based on the determination that the identified database is down, mapping the data transaction request to an alternative database of the plurality of databases.

22. The method of claim 10, further comprising:
  monitoring a status of the plurality of databases; and
  using the data access layer to balance a load on the plurality of databases in response to the monitored status.

23. The method of claim 10, further comprising:
  splitting a data transaction request to different databases of the plurality of databases; and
  gathering results received from the different databases and presenting them to the requesting computer.

24. A non-transitory machine-readable storage medium comprising instructions that, when executed by one or more processors, cause the machine to perform operations comprising:
  receiving a data transaction request from at least one requesting computer, the data transaction request being an object oriented request; and
  using a data access layer that defines an abstraction layer to identify, using one or more processors, at least one database from the plurality of databases, the plurality of databases being horizontally distributed; and
  defining an object oriented abstraction layer between the at least one requesting computer and the plurality of databases.

* * * * *